United States Patent

Neff et al.

[11] 3,904,078
[45] Sept. 9, 1975

[54] INJECTION MOLDING MACHINE HAVING A PROGRAMMING DEVICE AND A METHOD OF OPERATING THE MACHINE

[75] Inventors: Engelbert Neff, Zollikon; Jakob Fehr, Mollis, both of Switzerland

[73] Assignee: Maschinenfabrik u. Gusserei Netstal AG, Switzerland

[22] Filed: Jan. 18, 1974

[21] Appl. No.: 434,410

[30] Foreign Application Priority Data
Feb. 7, 1973  Switzerland.................. 1777/73

[52] U.S. Cl. .................. 222/1; 222/63; 425/145
[51] Int. Cl.² ................................. B67D 5/08
[58] Field of Search ............. 222/1, 52, 61, 63; 425/145, 149; 141/192

[56] References Cited
UNITED STATES PATENTS
3,642,404  2/1972  Nagawa .................... 425/145
3,797,808  3/1974  Ma et al. .................. 222/63 X Primary Examiner—Robert B. Reeves
Assistant Examiner—Hadd Lane
Attorney, Agent, or Firm—McGlew and Tuttle

[57] ABSTRACT

An injection molding machine, particularly for plastics, comprises an injection cylinder having an injection discharge at one end and an inlet for material to be plasticized which is spaced therefrom. An injection screw is rotatable in the cylinder and it is also movable by the force of a fluid pressure applied against a piston so that it will advance in the cylinder. A connection for supplying a pressure for operating the piston is connected to a control device which in turn is connected to means for measuring the pressure for actuating the piston and for also measuring the distance of movement of the injector screw and the velocity of its movement. The operating pressure for advancing the screw is continuously measured and the switching device which is connected to the control is operated so that upon reaching a predetermined hydraulic pressure and after a predetermined movement of the screw and a predetermined filling distance movement, the mold filling phase is carried out in which the injection velocity is controlled as a function of the covered distance and this control is switched over to an after pressure phase in which the after pressure is applied for a predetermined time control period on the basis of the operating pressure.

10 Claims, 4 Drawing Figures

INJECTION MOLDING MACHINE HAVING A PROGRAMMING DEVICE AND A METHOD OF OPERATING THE MACHINE

BACKGROUND OF THE INVENTION

1. Field of the Invention

This invention relates in general to the construction and operation of an injection molding machine and, in particular, to a new and useful injecting molding machine comprising a fluid pressure operated plasticizing and injection screw having a programming device controlling the hydraulic pressure through a control unit into a method of operation of the machine.

2. Description of the Prior Art

With increasing demands on the quality of injection-molded parts made of thermoplastics, thermosetting plastics, and elastomers, more and more importance is attached to the reproducibility of operational conditions and steps. The end toward which an injection molding process is directed is to inject an invariably homogeneous molten mass of plastic having a predetermined temperature and constant physical properties into one or more mold cavities in such a manner that a filling of the cavities as homogeneous and stress-free as possible is obtained.

It is well known that at a constant temperature of the mold, the injection velocity is a decisive parameter for a stress-free or low stress filling of the mold. Through the shear and tangential stresses of the flowing mass, the injection velocity affects the stress conditions within the mass in place and, in connection with the temperature equalization process in the mold, is of greatest importance for the building-up or relaxation of the stress zones. That is why the known machines are provided with devices for measuring the stroke velocity of and the distance covered by the screw, and with a control unit ensuring by comparison of the measured velocity with a predetermined velocity for each distance portion that during the filling of the mold, the hydraulic pressure be varied so as to assure the desired speed variation of the screw.

It is further known that once the mold is filled, the pressure and temperature are the decisive variables determining the state of the solidifying mass. For this reason, the pressure within the mass at the end of the mold filling operation and the development of the so-called after pressure up to the setting of the runner are particularly important. For this purpose, known machines are equipped with devices for measuring the filling pressure within the mold and these pressure data are used for varying the parameters of the subsequent cycle, or for terminating the mold filling operation as a function of this pressure, or for starting the after pressure. In this process, it is disadvantageous that the pressure measuring arrangement within the mold cavity must be designed individually for each mold. Thus, problems arise in each case as to the location of the sensor, for example, if it should be positioned close to or distant from the runner, or as to the built-in conditions in the mold. Another drawback is that each mold must be provided with its own sensor and that, in general, the mounting and dismounting of a sensor is a very complicated operation.

SUMMARY OF THE INVENTION

The present invention is directed to the design of a machine of the indicated type in which the mentioned shortcomings are avoided and the mold-filling operation, the switching over to the after pressure, and the after pressure operation itself, are started and controlled exclusively on the basis of values taken from the machine and not from the mold. To this end, in accordance with the invention, there is provided a device for the continuous measuring of the hydraulic pressure and a switching device which, as soon as a predetermined hydraulic pressure is reached, but not later than after the screw has covered a predetermined filling distance, switches over from the mold filling phase of the operation in which the velocity of the injection is controlled as a function of the screw advance, to an after pressure phase in which the pressure is time-controlled as a function of the hydraulic pressure.

Since both the values used for the control of the partial phases of the program, and the values for the switching over from the mold filling to the after pressure phase are picked off the machine and independent of the mold used in the respective case, all of the difficulties issuing from the mounting of a pressure sensor within the mold are eliminated.

The hydraulic pressure can be measured in a relatively simple way. During the program phase in which the velocity is distance dependent, the hydraulic pressure is varied so that in each portion of the stroke, the screw velocity complies with the program. During the injection, the increasing filling resistance is transferred to the screw and the hydraulic pressure advancing the screw is increased correspondingly. The pressure rise within the mold, occurring at the end of the injection operation, causes a corresponding rise of the hydraulic pressure in accordance with the velocity control. The arrangement is made so that after the hydraulic pressure which is continously measured has reached a preprogrammed value, but not later than after the screw has teminated its pre-programmed injection stroke, the device is switched over to the after-pressure phase.

Accordingly, it is an object of the invention to provide an injection molding machine for plastics which comprises a fluid pressure operated injection screw which is rotated and which is also advanced in its injection cylinder by applying fluid pressure in a controlled amount based on a continuous measurement of the hydraulic pressure required to advance the screw and wherein, after a predetermined hydraulic pressure is achieved and the screw has moved a predetermined distance, the further movement of the screw in an after pressure phase is carried out by a time controlled application of fluid pressure regulated as a function of the pressure actually being applied thereto.

A further object of the invention is to provide an injection molding machine, wherein an injection screw is moved in an injection cylinder by a fluid pressure which is applied independently of the mold used in the injection process in accordance with the pressure developed by movement of the screw itself and the distance and velocity of movement of the screw.

A further object of the invention is to provide a method of operating an injection molding machine having a plasticizing screw which is rotatable and movable in an injection cylinder for the discharge of the plasticized material through a discharge opening, comprises moving the screw under the force of a fluid pressure applied thereto and continuously measuring the pressure being applied to move the screw and also measuring the distance of movement of the screw and the velocity of its movement and, upon reaching a predetermined hydraulic pressure but not after the screw has moved a predetermined distance in injecting the plastic material during a mold filling phase of movement in which the injection velocity is controlled as a function of the covered distance, subsequently moving the injector screw in an after pressure phase in which the after pressure is time controlled on the basis of the pressure being applied.

A further object of the invention is to provide an injection molding machine which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which there is illustrated a preferred embodiment of the invention.

GENERAL DESCRIPTION OF THE PREFERRED EMBODIMENT

Figure 1:
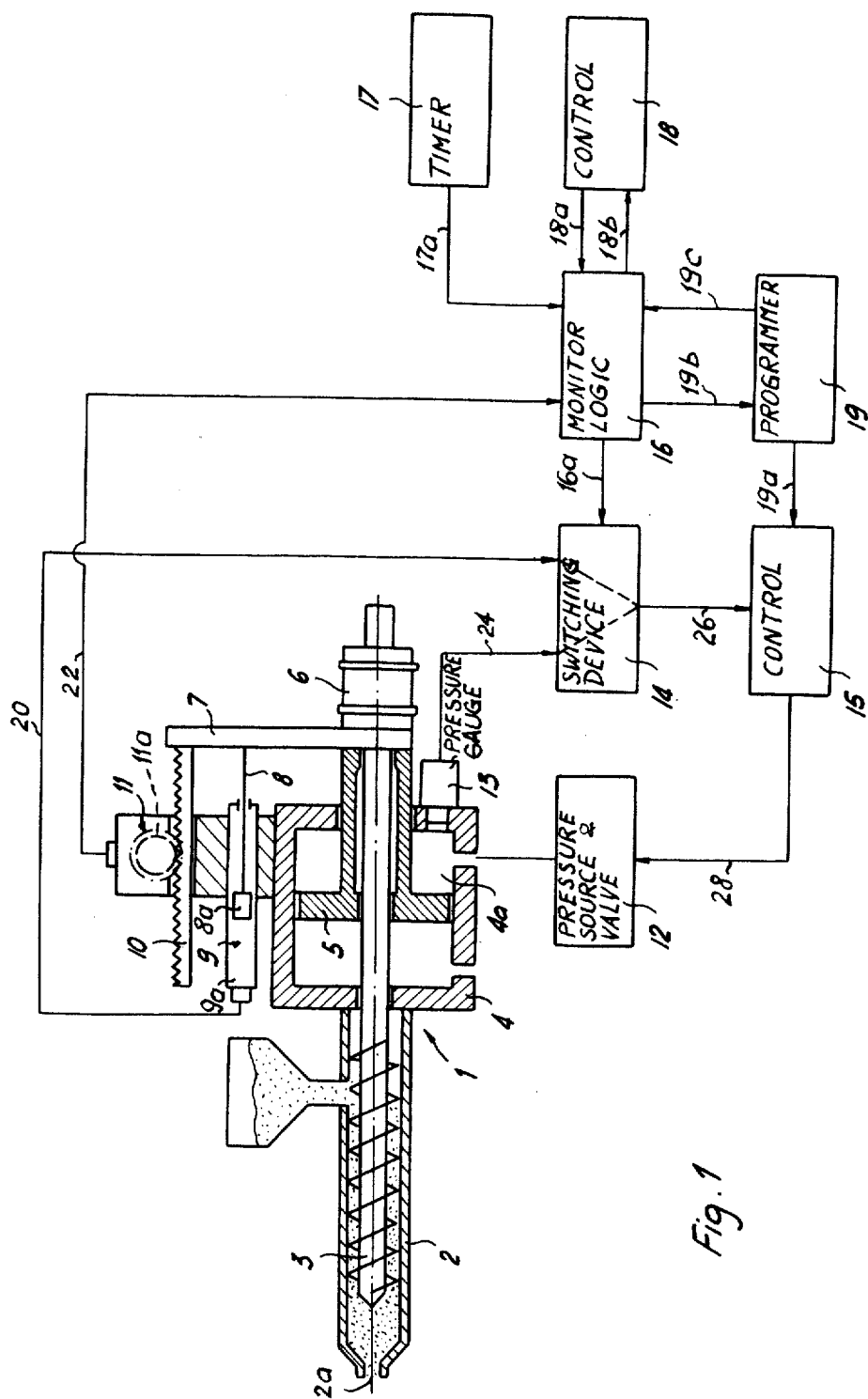
FIG. 1 is a schematic axial sectional view of a plasticizing and injection unit of an injection molding machine having a programmable injection and after pressure control and automatic mold filling control operating in accordance with the invention.

Referring to the drawings in particular, the invention embodied therein, as seen in FIG. 1, comprises a plasticizing and injection unit, generally designated 1, which includes a heating cylinder 2 and a plasticizing screw 3 which is movable backwardly and forwardly in the cylinder and which also rotates in the cylinder. The plasticizing screw 3 includes a back end which extends through an injection cylinder 4 and is coaxially received in and rotatably coupled to and axially movable with an injection piston 5. A driving motor 6 is connected to screw 3 and rotates the screw. A plate 7 is mounted on the rear end portion of screw 3 but it is anchored against rotation, but mounted for axial displacement along with the screw. Plate 7 is connected through a piston rod 8 to a velocity meter, generally designated 9, which includes a piston portion 8a which rides in a cylinder 9a. A distance meter, generally designated 11, comprises a rack 10 which is secured to plate 7 for movement therewith and a gear 11a which is rotated thereby. The two meters 9 and 11 are connected by electrical connections 20 and 22 to a switching device 14, which is also connected by a connection 24 to a pressure gauge 13 which senses the pressure within a chamber 4a of the cylinder 4. An apparatus 12 which comprises a combined servo valve and a fluid pressure source, such as a hydraulic pressure source, is connected through a connecting line to the interior of chamber 4a of cylinder 4 in which a controlled pressure is applied to move piston 5 along with screw 3 in a direction toward discharge 2a of injection cylinder 2. The pressure gauge 13 is designed to transmit electrical signals to the line 24 to the switching device and through a line 26 to a control 15 which in turn is connected through a line 28 to the apparatus comprising the pressure source and the valve 12. Thus, a continuous sensing of the pressure is transmitted from the cylinder space 4a which provides the motor pressure for moving the screw 3.

The outputs of velocity meter 9 and pressure gauge 13 are connected through lines 20 and lines 12a and pressure source in valve 12 and line 28, control 15 and line 26 to a selecting unit or switching device 14. The output of the selecting unit 14 is connected to the control unit 15 which actuates the servo valve of device 12. The output of the distance meter, generally designated 11, is connected through line 22 to a monitoring logic 16 which in turn is connected through a line 16a to the switching device 14. The monitoring logic 16 is associated with a timer 17 by a connection 17a and with a control 18 by back and forth connections 18a and 18b. Control 18 controls the other operations of the machine, such as the closing and opening of the mold, etc. The monitoring logic 16 further cooperates with a program unit 19 which controls the control unit 16 via connection 19a. Back and forth connections 19b and 19c extend from monitor logic 16 to programmer 19.

Figure 2A:
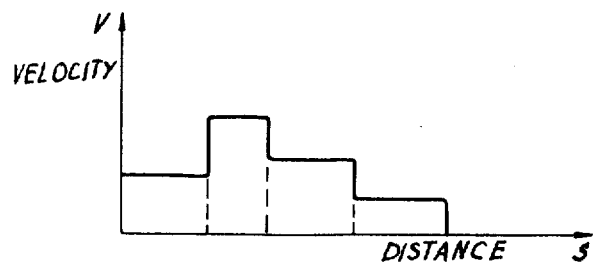
FIGS. 2a and 2b are diagrams showing a distance dependent velocity program for the mold filling phase and a time dependent pressure or after pressure program for the after pressure phase, respectively.
Figure 2B:
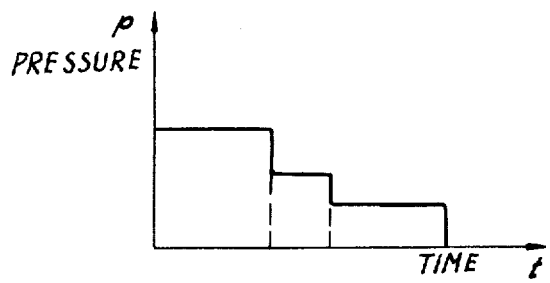

The programming, monitoring and controlling equipment of the plasticizing and injection unit 1 is designed for the following operational sequence:

During the injection piston 5, and thereby screw 3, are advanced axially to the left, as shown in FIG. 1, by the hydraulic pressure produced in cylinder space 4a and supplied from device 12. At the same time, a distance dependent velocity program is carried out on the basis of the actual value signal transmitted from distance meter 11 and velocity meter 9 through selecting unit 14, and of the set value signal coming from the programmer 19. Such a program, comprising four distance portions, with different velocities, is shown in FIG. 2a, for example, wherein the velocity $v$ is plotted against the path or distance $s$. Any desired velocity program may be set by means of program unit 19. At the end of the last distance portion of this injection velocity program, upon a corresponding signal of the program unit 19, given to monitoring logic 16, the selecting unit 14 is switched over so that the actual value signal of pressure gauge 13 is continuously delivered to selecting unit 14 and is transmitted to control unit 15 simultaneously with the hydraulic pressure set value signal which comes from program unit 19 and thus a time dependent pressure or an after pressure program or phase is carried out. Such a pressure program or phase is represented in FIG. 2b. In the diagram the pressure $p$ is plotted against the time $t$ and, in the present example, is broken down into three intervals. This program can also be selected freely by setting the program unit 19.

Figure 3:
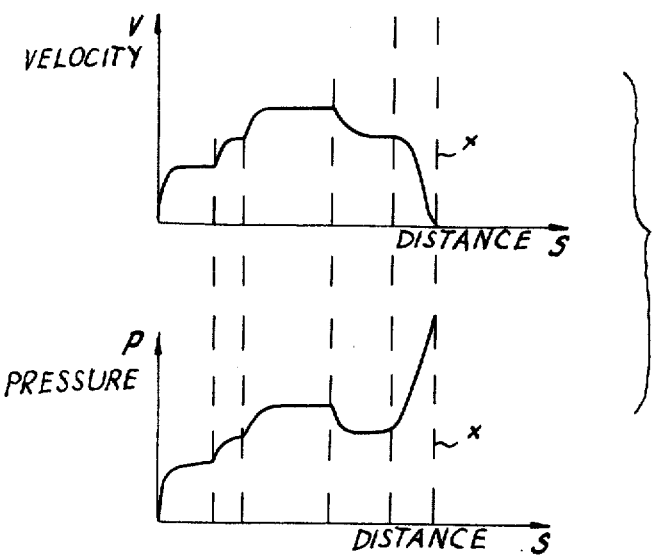
FIG. 3 is a diagram showing an example of the variation of the hydraulic pressure in accordance with the respective injection velocities during the mold filling phase.

During the velocity controlled injection operation, the hydraulic pressure is varied by means of the servo valve portion of device 12 so as to maintain the predetermined velocities as shown in the upper diagram of FIG. 3. With the rising back pressure exerted on screw 3, and due to the filling resistance which grows with the mold filling amount, the hydraulic pressure behind injection piston 5 is also increased, so that the preselected velocity is kept constant.

The end of the mold filling operation at the location $x$, as shown in FIG. 3, is characterized by a pressure rise in the mold. This pressure rise, transmitted by screw 3 as a back pressure, causes a corresponding rise of the hydraulic pressure $p$ in cylinder 4, as shown in the lower diagram of FIG. 3. This is due to the velocity control. Thus, it is made possible to follow the termination of the mold-filling process and the pressure rise within the mold by following the variation of the hydraulic pressure and, as a measurement technique, to evaluate the respective indications as equivalents for the pressure variations of the mass within the mold.

In the described example, the variation of the hydraulic pressure is used so that the desired mold filling pressure or the corresponding hydraulic pressure which, in many cases but not necessarily all cases, corresponds to the first after pressure, is preselected in the program unit 19. As soon as the preselected pressure is reached, the monitoring logic 16 switches automatically, through selecting unit 14, from the distance dependent velocity program (FIG. 2a) to the time dependent pressure or after pressure program (FIG. 2b).

If the preselected pressure is not reached within the last distance portion of the velocity program, the after pressure program is started at the end of this distance portion. In the described example, the switching pressure at which the velocity program is switched over to the pressure program corresponds to the selected first set pressure value of the after pressure program. In rapid injection operations, it may become necessary to lower the after pressure relative to the injection pressure required for the velocity program. In the present example, this is made possible by assigning to the first set pressure value, the duration of zero seconds, thus using this pressure value only for the automatic switching over with the immediately following lower after pressure or the after pressure program.

By combining the velocity control with the measuring of the hydraulic pressure, the described arrangement makes it possible to determine the mold filling degree on the basis of values taken from the machine. The components used for the evaluation and control are bound to the machine and are independent of the used mold so that the problem of detecting the pressure directly in the mold does not arise. Aside from the automatic monitoring of the filling degree in the mold, two of the comprised units form the core part of the programmable control arrangement, namely, the so-called monitoring logic and the programmer. Advantageously, both the monitoring logic and the program unit are designed as all electronic units. Therefore, some of the known programming and storing possibilities come into question, for example, crossbar distributors, digital cam switches, semiconductor storages or core memories with a central keyboard data input.

For purposes of an automatic programming through data input equipment, such as punched tape readers, etc., the most suitable component parts are semiconductor storages or core memories. The usual design of the central data input is disadvantageous insofar as the individual values have to be addressed through a multi-digit figure and, in general, namely with core memories, and the stored values are centrally displayed only on interrogation. Such a renunciation of a simultaneous display of the programmed values produces an unfavorable effect on the operational convenience.

In the described example, there is used either an arrangement with digital cam switches including a simultaneous display, however, not automatically programmable, or a storage arrangement permitting a data input through a central keyboard where the individual values are simultaneously displayed by luminous numerals. A special switching logic permits a non-central direct addressing through an inpulse key or, in a special design, through a reed relay provided at the respective display and actuated by a magnet. Thus, a simple overwriting of the storage through the keyboard is possible at any time. It is also possible, in addition to the non-central addressing and simultaneous display, to make use of the advantageous automatic data input and output through punched or magnetic tapes, etc.

While a specific embodiment of the invention has been shown and described in detail to illustrate the application of the principles of the invention, it will be understood that the invention may be embodied otherwise without departing from such principles.

What is claimed is:

1. An injection molding machine, particularly for plastics, comprising an injection cylinder having an injection discharge and an inlet for material to be plasticized spaced therefrom, an injector screw rotatable in said cylinder, means to rotate said injector screw, a pressure cylinder, a piston connected to said screw and being movable in said cylinder to advance said screw, pressure means for supplying fluid pressure to said pressure cylinder to advance said piston, pressure measuring means for measuring the pressure in said cylinder to advance said piston connected to said cylinder, velocity measuring means connected to said screw for measuring the velocity of movement thereof, distance measuring means connected to said screw for measuring distance moved by said screw in operation, a control unit connected to said pressure means for controlling the fluid pressure of said pressure cylinder, and a switching device connected to said control unit to said pressure means and to said pressure measuring means and said velocity measuring means, effective during operation of said screw and upon the reaching of a predetermined pressure in said cylinder and not later than after the screw has moved in a predetermined distance to eject the plastic material, to regulate said pressure means in accordance with the covered distance and thereafter to cause said pressure means to apply an after pressure for a period of time.

2. An injection molding machine, according to claim 1, wherein said pressure measuring means comprises a pressure gauge exposed to the pressure in said cylinder behind said piston, said velocity measuring means comprising a movable member adapted to produce an electrical signal in response to the velocity of movement of said screw, a switching device connected to said pressure gauge and said velocity measuring means and to said control, said control being connected to said pressure means to regulate the pressure supplied behind said piston.

3. An injection molding machine, according to claim 2, wherein said pressure means comprises a pressure source and a servo valve operated by said control for regulating the connection of said pressure source to said cylinder.

4. An injection molding machine, according to claim 2, wherein said distance measuring means comprises an instrument generating an electric signal in pro portion to the movement distance of said injector screw, a monitoring logic connected to said distance measuring means and to said switching device and a timer connected to said monitoring logic.

5. An injection molding machine, according to claim 4, including a programmer connected to said monitoring logic and to said control unit.

6. An injection molding machine, according to claim 1, wherein said pressure cylinder comprises a cylinder arranged alongside one end of said injector cylinder, said injector screw including a rib portion extending into said pressure cylinder, said piston surrounding said rear portion of said injector screw and being affixed thereto for rotation and movement therewith, a non-rotatable plate connected to said rear portion of said injector screw, said distance measuring means comprising a rack carried on said plate, and a gear rotated by said rack upon movement thereof and generating an electrical signal.

7. A method of operating an injection molding machine for molding plastics which includes an injection screw rotatably and axially displaceably mounted in an injection cylinder having a discharge, means for rotating said injector screw and a pressure piston connected to the screw and being movable by hydraulic pressure to displace said screw, comprising supplying a pressure to said piston to displace said screw during the injection process and continuously measuring the pressure applied to the screw, and upon reaching a predetermined pressure by not later than after the screw has covered a predetermined distance supplying a plastic for filling a mold during a mold filling phase of operation, wherein the movement of the injector is controlled as a function of the covered distance of movement by the injector screw, and thereafter, carrying out a pressure phase in which an after pressure is applied to the injector screw on a time controlled basis in proportion to the pressure applied.

8. An injection molding machine for plastics, comprising an injection cylinder having a discharge, a hydraulically operated plasticizing and injection screw longitudinally movable in said injection cylinder and a program unit having means for controlling the hydraulic pressure acting to move said screw through a control device, a device for continuous measuring of the hydraulic pressure, a timer, means continuously measuring the velocity of the movement of the screw, means continuously measuring the distance moved by said screw and a switching device by which, during a first mold filling phase terminated by reaching a predetermined hydraulic pressure but not later than after the screw has covered a predetermined portion of the filling distance, begins a second mold filling phase in which the said velocity is controlled as a function of the covered movement, said switching device being thereafter switched over to a third after pressure phase in which the after pressure is time controlled on the basis of a hydraulic pressure higher than said petermined pressure.

9. An injection molding machine for plastics, according to claim 8, wherein the output of the device for measuring the hydraulic pressure and the output of a device for measuring the injection velocity are connected to a selecting device associated with a monitoring logic which is connected to the outputs of the screw advance measuring device and of the timer and cooperates both with the machine control and an adjustable program unit which, for transmitting set value signals of the injection velocity and the hydraulic pressure, is connected to a control unit acting on the hydraulic pressure in the injection cylinder through a servo valve.

10. An injection molding machine for plastics, according to claim 9, wherein the monitoring logic and the program unit are designed as all electronic units.

* * * * *

UNITED STATES PATENT OFFICE
CERTIFICATE OF CORRECTION

Patent No. 3,904,078   Dated September 9, 1975

Inventor(s) Engelbert Neff et al

It is certified that error appears in the above-identified patent and that said Letters Patent are hereby corrected as shown below:

Assignee should read

-- Maschinenfabrik und Giesserei Netstal AG. --

Signed and Sealed this

Twenty-first Day of September 1976

[SEAL]

Attest:

RUTH C. MASON
*Attesting Officer*

C. MARSHALL DANN
*Commissioner of Patents and Trademarks*